United States Patent [19]

Sebba

[11] Patent Number: 4,486,333

[45] Date of Patent: Dec. 4, 1984

[54] PREPARATION OF BILIQUID FOAM COMPOSITIONS

[76] Inventor: Felix Sebba, 711 Crestwood Dr., Blacksburg, Va. 24060

[21] Appl. No.: 361,058

[22] Filed: Mar. 23, 1982

[30] Foreign Application Priority Data

Apr. 10, 1981 [ZA] South Africa ................ 81/2413

[51] Int. Cl.$^3$ ............................................. B01J 13/00
[52] U.S. Cl. ................................... 252/307; 252/312; 252/314; 252/DIG. 14
[58] Field of Search ....... 252/307, 312, 314, DIG. 14, 252/315.1

[56] References Cited

U.S. PATENT DOCUMENTS 3,900,420  8/1975  Sebba .................................. 252/307

OTHER PUBLICATIONS

Hackh's, *Chemical Dictionary*, 4th Ed., McGraw-Hill Book Co., N.Y., (1969), p. 275.
Sebba, "Biliquid Foams", *J. of Colloid & Interface Science*, vol. 40, No. 3, Sep. 1972, pp. 468-474.
Sebba, "The Behaviour of Minute Oil Droplets Encapsulated in a Water Film", *Colloid & Polymer Sci.*, 257, (1979), pp. 392-396.

*Primary Examiner*—Richard D. Lovering
*Assistant Examiner*—Anne Brookes

[57] ABSTRACT

A biliquid foam composition is prepared by agitating a hydrogen bonded liquid containing a soluble surfactant to produce a gas foam and intermittently adding to the gas foam a non-polar liquid which is immiscible with the hydrogen bonded liquid, the surfactant-containing hydrogen bonded liquid and non-polar liquid being selected to provide a spreading coefficient equal to or greater than zero. The resulting mixture is agitated after each addition so as to cause the non-polar liquid to initially spread on the foam surfaces and thereafter form non-coalescing globules of non-polar liquid dispersed in a continuous phase of the hydrogen bonded liquid and each encapsulated in a double surfaced surfactant-stabilized film of the hydrogen bonded liquid containing the soluble surfactant. The quantity of non-polar liquid added at each addition is such that the hydrogen bonded liquid remains the environment of any encapsulated globules of non-polar liquid formed, the total phase volume ratio (PVR) of the non-polar liquid to the hydrogen bonded liquid being up to about 50. The biliquid foams prepared in accordance with the invention have several noteworthy applications. For example, biliquid foams made of hydrocarbons and water are exceptionally good cleaning agents since they comprise both a finely dispersed hydrocarbon which can remove greases and water combined with detergent which can remove water soluble soils.

26 Claims, No Drawings

PREPARATION OF BILIQUID FOAM COMPOSITIONS

The present invention relates to a method of preparing biliquid foam compositions. More particularly, the invention is concerned with the preparation of a biliquid foam of the water-lamella type where small globules of a non-polar liquid such as oil are encapsulated in a surfactant-stabilized film of a hydrogen bonded liquid such as water and separated from one another by a further thin lamella of the hydrogen bonded liquid.

Systems resembling gas foams with the gas cells replaced by liquids have been described by the Applicant in J. Colloid Interface Sci., 40, 468–474 (1972) and in Colloid & Polymer Sci., 257, 392–396 (1979). These biliquid foams are essentially of two types: oil-lamella and water-lamella. An oil-lamella biliquid foam consists of aqueous cells coated with an oil film and separated one from another by an oil lamella. In this type, the oil phase corresponds to the aqueous phase in a conventional gas foam, and the water globules correspond to the gas cells. The second type of biliquid foam is one in which the discontinuous phase is the oil or a non-polar liquid and the encapsulating phase is water or a hydrogen bonded liquid which contains a soluble surfactant. The encapsulating film as well as the foam lamella are stabilized by the surfactant. In both types, the cells are held together by Laplace capillary pressures, just as are the soap bubbles in a gas foam.

The water-lamella biliquid foams with which the present invention is concerned are to be distinguished from oil-in-water emulsions in which the discontinuous oil phase is separated from the continuous aqueous phase by a single interface. In the composition under consideration, the globules of non-polar liquid are encapsulated in a double surfaced film of a hydrogen bonded liquid which is immiscible with the non-polar liquid and contains a soluble surfactant. Such units which have been called by the Applicant "aphrons" are dispersed in a continuous phase of the hydrogen bonded liquid. When the concentration of the aphrons gets large enough for them to interfere with one another, the dispersion medium becomes compressed into a lamella so that a biliquid foam develops. Such a biliquid foam is in fact an aggregate of aphrons and is thus called a polyaphron.

In the case of polyaphrons, the cells themselves are very small, usually of the micron or submicron size, and the continuous foam lamella which separates the cells is very thin. As in gas foams, the physical properties of the polyaphrons are largely determined by the elastic nature of the lamella. Polyaphrons, however, are much more stable than gas foams and, if properly prepared, may have a life-time of up to several years; but, like conventional foams, they can be broken on contacting with hydrophobic substances.

In the production of polyaphrons as described in Applicant's aforesaid publications, an aqueous gas foam is first prepared using an aqueous solution of a surfactant and is then placed on top of a non-polar liquid to float thereon. Thereafter, some more of the non-polar liquid is poured onto the aqueous gas foam; because the non-polar liquid is heavier than the gas foam, it trickles through the foam as fine droplets which get coated with the aqueous solution. At the bottom of the gas foam, it passes through the second interface and completes the requirements for a foam, resulting in a polyaphron. As the gas foam decays and becomes heavier, the water drains through the polyaphron which persists.

The above technique has a major drawback in that it is very difficult to prepare a stable polyaphron in which there is more than about 75% by volume of the discontinuous non-polar liquid phase. A further drawback is that the globules produced are comparatively large, often visible to naked eye. Such a method is thus in practice limited to the preparation of polyaphrons having a phase volume ratio (PVR) of the non-polar liquid phase to the hydrogen bonded liquid phase not greater than about 3, and which last only a few hours or at most days.

It is an object of the present invention to overcome this drawback and to provide a method of preparing a stable polyaphron having a PVR of up to about 50, with the hydrogen bonded liquid phase still remaining as the continuous phase.

According to the invention, a biliquid foam or polyaphron is prepared by agitating a hydrogen bonded liquid containing a soluble surfactant to produce a gas foam and intermittently adding to the gas foam a non-polar liquid which is immiscible with the hydrogen bonded liquid, the surfactant-containing hydrogen bonded liquid and non-polar liquid being selected to provide a spreading coefficient equal to or greater than zero. The resulting mixture is agitated after each addition so as to cause the non-polar liquid to initially spread on the foam surfaces and thereafter form non-coalescing globules of non-polar liquid dispersed in a continuous phase of said hydrogen bonded liquid and each encapsulated in a double surfaced surfactant-stabilized film of the hydrogen bonded liquid containing the soluble surfactant. The quantity of non-polar liquid added at each addition is such that the hydrogen bonded liquid remains the environment of any encapsulated globules of non-polar liquid formed, the total phase volume ratio of the non-polar liquid to the hydrogen bonded liquid being up to about 50.

Applicant has surprisingly found that by intermittently adding the non-polar liquid to the gas foam and agitating the resulting mixture after each addition and by controlling the quantity of non-polar liquid added at each addition such that the hydrogen bonded liquid remains the environment of any encapsulated globules of non-polar liquid formed, it is possible to significantly increase the total amount of non-polar liquid which can be incorporated as a discontinuous phase and thus to obtain a polyaphron having a PVR of up to about 50. The method of the invention not only enables the size of the globules to be accurately predetermined, but also enables one to produce a polyaphron which is reproducible and stable over a long period of time.

It is also important that the surfactant-containing hydrogen bonded liquid and non-polar liquid be selected to provide a spreading coefficient equal to or greater than zero. This condition ensures that the non-polar liquid will spread on the hydrogen bonded liquid, which is an essential step in the formation of aphrons. The provision of a gas foam comprising as continuous phase the hydrogen bonded liquid enables one to provide sufficient surface for the non-polar liquid to initially spread as a thin sheet and thereafter break up into fragments. As these fragments retract to form globules, the globules become encapsulated in a film of the hydrogen bonded liquid which contains the surfactant, thus resulting in aphrons.

It should be noted that the gas foam is only needed as a starter and that as aphrons are formed additional surface is generated which serves as a site for further aphrons to form, and thus the production becomes autocatalytic. Accordingly, if a previously prepared polyaphron is available, it can be used as a starter for making further aphrons so that the preliminary forming step is no longer necessary.

The present invention therefore provides, in another aspect thereof, a method of preparing a polyaphron starting with a previously prepared polyaphron having the same or different composition, which comprises diluting the previously prepared polyaphron with a predetermined quantity of the surfactant-containing hydrogen bonded liquid, intermittently adding to the diluted polyaphron the non-polar liquid and agitating the resulting mixture after each addition so as to cause the non-polar liquid to initially spread on the aphron surfaces and thereafter form additional aphrons. As in the former case, the quantity of non-polar liquid added at each addition is such that the hydrogen bonded liquid remains the environment of any new aphrons formed, the total phase volume ratio of the non-polar liquid to the hydrogen bonded liquid being up to about 50.

It is essential that the non-polar liquid be added in quantities such that the hydrogen bonded liquid remains the environment of any aphrons formed and a non-polar liquid environment is prevented, thereby ensuring that the non-polar liquid added is converted into aphrons immediately. Too much non-polar liquid at any stage could change the environment of the aphrons so that further formation of aphrons will be prevented and this may result in a water-in-oil type emulsion. One way of achieving this is by adding the non-polar liquid in small doses, preferably in a quantity which progressively increases in volume at each addition, the quantity of non-polar liquid added at each addition being not more than about 15% by volume of the total amount of non-polar liquid to be added.

As an example, a polyaphron can be produced by first preparing a solution of the surfactant in the hydrogen bonded liquid and placing the total quantity needed for a predetermined PVR polyaphron in a stoppered bottle. This solution is shaken vigorously in order to produce a foam, the purpose of which is to provide a very much increased surface area for the spreading of the non-polar liquid to take place. To this foam is added a small quantity of the non-polar liquid, for example 1 ml, and the bottle is shaken again. This generates the first aphrons, but, significantly, also produces additional surface because each aphron has an outer surface coated with hydrogen bonded liquid which is available for the spreading of the non-polar liquid. The next dose of non-polar liquid can now be increased, for example to 2 ml, and the bottle shaken again. The non-polar liquid can then be added in quantities which increase in a geometric progression. As the non-polar liquid content is increased, the tendency to foam diminishes and eventually stops, but the formation of aphrons still continues, proceeding at the surfaces of the aphrons themselves.

However, as explained above, care has to be taken not to have too much non-polar liquid at any one stage because of the danger of causing the polyaphron to contract, making it impossible for the non-polar liquid added to get to the interfaces and thus spread and be converted into further aphrons. Therefore, to make 200 ml of polyaphron, it is best not to introduce the non-polar liquid in quantities larger than about 30 ml, preferably 10 ml, at a time. If, for any reason, during the preparation, the polyaphron breaks, i.e. exudes non-polar liquid which can no longer be reincorporated into the polyaphron just by shaking, it was found that the best way to regenerate the polyaphron is by draining off the non-polar liquid phase which separates from the polyaphron and then gradually adding it, as before, to the residual polyaphron with shaking. By careful preparation, it was found possible to make a polyaphron having a PVR of up to about 50, that is, containing about 100 parts by volume of non-polar liquid and about 2 parts by volume of hydrogen bonded liquid. Such polyaphrons of high PVR do not last more than a few hours and thus are less stable than polyaphrons having a PVR of about 20 which have been observed to persist for several years. The life-time of the less stable polyaphrons, however, can be considerably increased by adding a viscosity increasing additive to the surfactant solution.

The hydrogen bonded liquid is usually water, but any liquid which contains hydrogen bonding is suitable, such as alcohols and glycols. Mixtures of such liquids can also be used, for example, a mixture of about 96% by volume of alcohol and about 4% by volume of water.

The hydrogen bonded liquid must contain a soluble surfactant in an amount to stabilize the film which encapsulates each aphron as well as the continuous foam lamella between the aphrons. This surfactant acts like a foaming agent and is used preferably in an amount of at least about 0.3% by weight of the hydrogen bonded liquid.

Examples of suitable surfactants for water are the water soluble anionic, cationic or non-ionic surfactants, such as polyethylene oxide derived surfactants, alkali metal alkyl-benzene sulphonates and quaternary ammonium surfactants. The sodium salt of dodecylbenzene sulphonate is particularly preferred, but in general it has been found that any water soluble surfactant that would produce a good foam will produce a stable polyaphron.

The non-polar liquid is generally used in a total amount of about 60% to about 98% by volume, the hydrogen bonded liquid constituting the balance. A typical example of a polyaphron contains about 95% by volume of the non-polar liquid and about 5% by volume of the hydrogen bonded liquid. Examples of suitable non-polar liquids are animal and vegetable oils, petroleum derivatives, paraffins and liquid halogenated hydrocarbons such as liquid FREONS (trademark).

The non-polar liquid generally contains a small but effective quantity of a soluble surfactant which enables the non-polar liquid to spread on the hydrogen bonded liquid. The amounts of surfactants in the non-polar liquid and hydrogen bonded liquid are adjusted to provide the aforesaid required spreading coefficient that will ensure the desired spreading process to occur. However, the addition of a surfactant which is soluble in the non-polar liquid is not required when the non-polar liquid has a spreading capability on its own, such as kerosene and impure oils. Kerosene has sufficient spreadability on water to dispense with the surfactant.

Where a surfactant is required in the non-polar liquid to render the latter spreadable on the hydrogen bonded liquid, it is generally used in an amount of about 0.1% to about 5% by weight, preferably about 1% by weight, of the non-polar liquid. Examples of suitable surfactants for this purpose are the non-ionic liquid surfactants such as oil soluble polyethyleneglycol ethers, and fatty acids.

Liquid surfactants are advantageous since they spread more uniformly. The surfactants of low HLB numbers sold by Union Carbide under the trademark TERGITOL are particularly preferred.

The size of the aphrons which generally ranges from about 0.1 to 10 microns in diameter is determined by the concentration of the surfactant which is soluble in the non-polar liquid, the higher the concentration, the smaller the aphrons. It should be noted, on the other hand, that the concentration of the surfactant which is soluble in the hydrogen bonded liquid is dependent upon the size of the aphrons, since the smaller aphrons are the larger is the relative surface area which has to be coated by the surfactant film. As the average size of the aphrons is determined by the concentration of the surfactant in the non-polar liquid, this will determine the minimum concentration of the surfactant which is soluble in the hydrogen bonded liquid.

A variety of polyaphrons have been produced using as the non-polar liquid kerosene, medicinal paraffin, petroleum ether, olive oil, trichloro trifluoro ethane, carbon tetrachloride, cyclohexane, $CCl_4$-cyclohexane mixtures, benzene, toluene. There appeared to be little difference in overall behavior of these polyaphrons although some were less stable than others, the difference depending on the viscosity of the non-polar liquid phase. With regard to the petroleum ether, however, an interesting phenomenon has been observed. By using a petroleum ether having a boiling point in the range of 40°–60° C. and containing about 1% by weight of TERGITOL 15-S-9 which has an HLB of 13.5, a polyaphron was produced with aphrons so small that these were virtually invisible even under oil-immersion microscopy. The polyaphron, at a PVR of about 9, turned out to be a transparent gel. If the back of one's hand is wet with a thin layer of water and then the gel polyaphron is smeared on it, it will start to boil and produce a foam. The gas in the foam, of course, is not air but petroleum ether vapor. In other words, at 37° C., the vapor pressure of the hydrocarbon which boils between 40°–60° C. is high enough to produce boiling. The reason why the skin must be wet first is simply to improve the heat conductance. Polyaphrons are very poor conductors of heat, but the water helps to disperse the individual aphrons. The same behavior was observed with polyaphrons made with trichloro trifluoro ethane, and it is believed that this could be used to produce an effective spontaneously foaming blanket to smother hydrocarbon fires.

The polyaphrons prepared in accordance with the invention are stable and last for days to years. There may be some exudation of the non-polar liquid phase, but the polyaphron can immediately be reconstituted by stirring or shaking. Undisturbed polyaphrons seem to be indefinitely stable and can be maintained for many years. Nevertheless, they can be quickly broken using techniques that will destroy foams. For example, a small amount of a non-wetting solid such as coal dust will destroy a polyaphron just as it will destroy a conventional foam.

The polyaphrons are characterized by extremely small non-coalescing globules of the non-polar liquid. This is because of the encapsulating surfactant film which surrounds each globule and acts as a barrier to coalescence, thus clearly distinguishing the system from an emulsion. If a polyaphron is stirred up with water, the aphrons will be dispersed but will soon spontaneously reaggregate to reform the polyaphron. If, however, it is dropped into a non-polar liquid, the polyaphron will contract and become so stiff that it resembles butter and can be cut with a knife, whereas before it had more the consistency of a thick cream.

Polyaphrons, because they have a structure which yet can flow, have applications in situations where it is desired to immobilise fine particles yet enable them to flow when necessary. Thus, incorporation of water-wetted coal dust into a polyaphron composed of kerosene and water produces a stable system which can be stored until required, when, under slight stress, it can be made to flow into a furnace. Spermatozoa can survive in a polyaphron for many hours so this system can be used for delayed fertilisation in cattle. If enzymes, bacteria or yeasts are captured in the encapsulating surfactant film, there is produced a system which combines local immobilisation with mobility. Oils which have a limited solubility in a hydrogen bonded liquid can be incorporated in a polyaphron without those limitations, such as for gasohol or diesohol.

A polyaphron, which has water as the continuous phase, can be simply diluted with water to produce a dispersion of aphrons in water. This, therefore, provides a means for storing a concentrate of precomminuted liquids, which on dilution can produce a dispersion of the required concentration. For example, such dispersions can be used to avoid the vigorous stirring stage in solvent extraction because the solvent liquid has already been broken down in making the aphrons.

Polyaphrons made of hydrocarbons and water are exceptionally good cleaning agents because they comprise both a finely dispersed hydrocarbon which can remove greases and water combined with detergent which can remove water soluble soils. As these polyaphrons have water as the continuous phase, they are easily rinsed away by water. For example, a container in which polyaphrons, although mainly oil, are stored, can be rinsed with water, and the surface of the vessel will show no sign of oiliness.

Polyaphrons made of gasoline or kerosene and containing up to 97% of the fuel can be used as safety fuels. Because of the encapsulating surfactant film, they burn more gently and the flame does not spread as rapidly as would conventional fuel. Polyaphrons can also serve as a means for storing volatile or otherwise dangerous liquids. Polyaphrons having water as the continuous phase are very poor conductors of heat as convection is prevented by the continuous aqueous foam structure. Thus volatile liquids can be kept at ambient temperature for longer than they could be if unencapsulated.

The following non-limiting examples illustrate the practice of the present invention.

EXAMPLE 1

An aqueous solution containing 4 g/l of sodium dodecylbenzene sulphonate was prepared. 5 ml of this solution was placed in a stoppered flask and shaken with air until it formed a gas foam. Then 100 ml of kerosene was added, 1 ml only at first, then 2 ml, then 4 ml and so on with 13 seconds shaking between each addition, but never adding more than 15 ml at a time. A milky dispersion formed and gradually became more viscous and towards the end showed marked thixotropic properties. The polyaphron thus prepared and having a PVR of 20 persisted for several years.

EXAMPLE 2

The procedure of Example 1 was repeated, except that 100 ml of kerosene containing 2% of TERGITOL 15-S-3 were used. A similar polyaphron was obtained, but with aphrons smaller in size.

EXAMPLE 3

5 ml of the polyaphron prepared in Example 1 was added to 5 ml of the aqueous surfactant solution described in the same Example, but without preliminary foaming. To this diluted polyaphron, 100 ml of kerosene was added, 5 ml at first and then in 10 ml quantities with 13 seconds shaking between each addition. A similar polyaphron of PVR 20 was produced.

Example 4

A polyaphron was produced in a similar way using 90 ml of a petroleum ether having a boiling point in the range of 40° C.–60° C. and containing 1% of TERGITOL 15-S-9, and 10 ml of the aqueous surfactant solution described in Example 1. The resulting polyaphron having a PVR of 9 was a transparent gel with the aphrons barely visible under the high power of an optical microscope. TERGITOL 15-S-9 is more soluble in water than TERGITOL 15-S-3. This gel has the property that if placed on a water wetted surface of the skin it boils to produce a lather spontaneously.

EXAMPLE 5

In the same way as in Example 1, a polyaphron having a PVR of 49 was prepared using 98 ml of carbon tetrachloride containing 5% of TERGITOL 15-S-3 and 2 ml of an aqueous solution containing 40 g/l of sodium dodecylbenzene sulphonate.

The stability of polyaphrons of high PVR can be increased by adding about 10% by volume of a 2% aqueous solution of a viscosity increasing additive such as POLYOX (trademark) to the aqueous surfactant solution.

EXAMPLE 6

A polyaphron made of water and a carbon tetrachloride-cyclohexane mixture was prepared using a polyaphron of different composition as a starter, i.e., using a water-kerosene polyaphron of PVR 20. 5 ml of the water-kerosene polyaphron was diluted with 5 ml of the aqueous surfactant solution described in Example 1. To this diluted polyaphron, 100 ml of the carbon tetrachloride-cyclohexane mixture was added, 5 ml at first and then in 10 ml quantities with 13 seconds shaking between each addition. The resulting polyaphron had the same PVR.

EXAMPLE 7

A polyaphron was prepared by making a 0.5% solution of a silicone block copolymer L 5614 produced by Union Carbide in 96% methanol, foaming 10 ml of this solution and gradually adding 90 ml of kerosene containing 0.1% of TERGITOL 15-S-3. The polyaphron thus prepared and having a PVR of 9 was stable for several days. A similar polyaphron was also made using ethanol instead of methanol.

I claim:

1. A method of preparing a biliquid foam composition, which comprises agitating a hydrogen bonded liquid containing a surfactant, which is soluble in it, to produce a gas foam, intermittently adding to said gas foam a non-polar liquid which is immiscible with said hydrogen bonded liquid, the surfactant-containing hydrogen bonded liquid and non-polar liquid being selected to provide a spreading coefficient equal to or greater than zero, and agitating the resulting mixture after each addition so as to cause said non-polar liquid to initially spread on the foam surfaces and thereafter form non-coalescing globules of non-polar liquid dispersed in a continuous phase of said hydrogen bonded liquid and each encapsulated in a double surfaced surfactant-stabilized film of said hydrogen bonded liquid containing said soluble surfactant, the quantity of non-polar liquid added at each addition being such that after each agitation all of it has been encapsulated by the said film so that there is no excess of unencapsulated non-polar liquid so that the encapsulated globules are surrounded only by said hydrogen bonded liquid, and the total phase volume ratio of said non-polar liquid to said hydrogen liquid being between the limits 1.5 to 49, that is the said non-polar liquid is used in a total amount 60% to about 98% by volume and said hydrogen bonded liquid is used in an amount of about 40% to about 2% by volume, the quantity of non-polar liquid added at each addition being not more than about 15% by volume of the total amount of non-polar liquid to be added.

2. A method as claimed in claim 1, wherein said hydrogen bonded liquid is water.

3. A method as claimed in claim 2, wherein said surfactant is a water soluble anionic, cationic or non-ionic surfactant.

4. A method as claimed in claim 3, wherein said water soluble surfactant is selected from the group consisting of polyethylene oxide derived surfactants, alkali metal alkylbenzene sulphonates and quaternary ammonium surfactants.

5. A method as claimed in claim 4, wherein said water soluble surfactant is sodium dodecylbenzene sulphonate and is used in an amount of about 0.4% by weight, and wherein said non-polar liquid comprises kerosene containing about 2% by weight of a soluble surfactant consisting of TERGITOL 15-S-3.

6. A method as claimed in claim 4, wherein said water soluble surfactant is sodium dodecylbenzene sulphonate and is used in an amount of about 0.4% by weight, and wherein said non-polar liquid comprises petroleum ether having a boiling point of 40°–60° C. and containing about 1% by weight of a soluble surfactant consisting of TERGITOL 15-S-9.

7. A method as claimed in claim 1, wherein said hydrogen bonded liquid is a mixture of about 96% by volume of alcohol and about 4% by volume of water.

8. A method as claimed in claim 1, wherein said surfactant is used in an amount of at least about 0.3% by weight of the hydrogen bonded liquid.

9. A method as claimed in claim 1, wherein said non-polar liquid is used in a total amount of about 95% by volume and said hydrogen bonded liquid phase is used in an amount of about 5% by volume.

10. A method as claimed in claim 1, wherein the quantity of non-polar liquid added at each addition is progressively increasing in volume 11. A method as claimed in claim 1, wherein said non-polar liquid is selected from the group consisting of animal and vegetable oils, petroleum derivatives, paraffins and liquid halogenated hydrocarbons.

12. A method as claimed in claim 11, wherein said non-polar liquid is kerosene and said hydrogen bonded liquid is water.

13. A method as claimed in claim 1, wherein said non-polar liquid contains a surfactant which is soluble in it, and wherein the amounts of surfactant in said hydrogen bonded liquid and said non-polar liquid are such as to provide said spreading coefficient.

14. A method as claimed in claim 13 wherein the amount of the oil-soluble surfactant which is dissolved in said non-polar liquid is such as to produce globules of non-polar liquid having a size ranging from about 0.1 to about 10 microns in diameter, each encapsulated in a film of hydrogen bonded liquid.

15. A method as claimed in claim 13, wherein the surfactant which is soluble in said non-polar liquid is used in an amount of about 0.1% to about 5% by weight of the non-polar liquid.

16. A method as claimed in claim 15, wherein the surfactant which is soluble in said non-polar liquid is used in an amount of about 1% by weight of the non-polar liquid.

17. A method as claimed in claim 13, wherein the surfactant which is soluble in said non-polar liquid is a non-ionic liquid surfactant.

18. A method as claimed in claim 17, wherein said non-ionic liquid surfactant is selected from the group consisting of fatty acids and oil soluble polyethyleneglycol ethers.

19. A method of preparing a biliquid foam composition starting with a previously prepared biliquid foam composition, said biliquid foam composition comprising a discontinuous phase of a non-polar liquid in the form of non-coalescing globules dispersed in a continuous phase of a hydrogen-bonded liquid, which is immiscible with said non-polar liquid, and contains a surfactant, which is soluble in it, each said globule being encapsulated in a double surfaced surfactant-stabilized film of said hydrogen bonded liquid containing said soluble surfactant, which method comprises diluting said previously prepared biliquid foam composition with a predetermined quantity of said surfactant-containing hydrogen bonded liquid, intermittently adding to the diluted biliquid foam composition said non-polar liquid and agitating the resulting mixture after each addition so as to cause said non-polar liquid to initially spread on the globule surfaces and thereafter form additional said encapsulated globules, the quantity of non-polar liquid added at each addition being such that after each agitation all of it has been encapsulated by the said film so that there is no excess of unencapsulated non-polar liquid so that the encapsulated globules are surrounded only by said hydrogen bonded liquid and the total phase volume ratio of said non-polar liquid to said hydrogen bonded liquid being between the limits 1.5 to 49, that is the said non-polar liquid is used in a total amount of about 60% to about 98% by volume and said hydrogen bonded liquid is used in an amount of about 40% to about 2% by volume, the quantity of non-polar liquid added at each addition being not more than about 15% by volume of the total amount of non-polar liquid to be added.

20. A method as claimed in claim 19, wherein said hydrogen bonded liquid is water.

21. A method as claimed in claim 20, wherein said surfactant is a water soluble surfactant selected from the group consisting of polyethylene oxide derived surfactants, alkali metal alkylbenzene sulphonates and quaternary ammonium surfactants.

22. A method as claimed in claim 19, wherein said surfactant is used in an amount of at least 0.3% by weight of the hydrogen bonded liquid.

23. A method as claimed in claim 19, wherein said non-polar liquid is selected from the group consisting of animal and vegetable oils, petroleum derivatives, paraffins and liquid halogenated hydrocarbons.

24. A method as claimed in claim 19, wherein said non-polar liquid contains a soluble surfactant and wherein the amounts of surfactants in said hydrogen bonded liquid and said non-polar liquid are such to provide a spreading coefficient equal to or greater than zero.

25. A method as claimed in claim 24, wherein the surfactant which is soluble in said non-polar liquid is used in an amount of about 0.1% to about 5% by weight of the non-polar liquid.

26. A method as claimed in claim 24, wherein the surfactant which is soluble in said non-polar liquid is a non-ionic liquid surfactant selected from the group consisting of fatty acids and oil soluble polyethyleneglycol ethers.

* * * * *